(12) United States Patent
Fox

(10) Patent No.: US 8,215,091 B2
(45) Date of Patent: Jul. 10, 2012

(54) LAWNMOWER GEARBOX

(75) Inventor: Charles A. Fox, Stockton, MO (US)

(73) Assignee: Superior Gearbox Company, Stockton, MO (US)

( * ) Notice: Subject to any disclaimer, the term of this patent is extended or adjusted under 35 U.S.C. 154(b) by 0 days.

(21) Appl. No.: 11/681,464

(22) Filed: Mar. 2, 2007

(65) Prior Publication Data

US 2008/0209879 A1    Sep. 4, 2008

(51) Int. Cl.
*A01D 34/00* (2006.01)
(52) U.S. Cl. ........................................ 56/17.5; 56/320.1
(58) Field of Classification Search ................... 56/17.5, 56/320.1, DIG. 6
See application file for complete search history.

(56) References Cited

U.S. PATENT DOCUMENTS

| | | | |
|---|---|---|---|
| 3,643,408 A * | 2/1972 | Kulak et al. ..................... | 56/17.4 |
| 4,009,558 A * | 3/1977 | Schulze et al. .................. | 56/341 |
| 4,321,783 A | 3/1982 | Kawasaki et al. | |
| 4,527,380 A | 7/1985 | Fushiya et al. | |
| 4,716,717 A | 1/1988 | Ogano et al. | |
| 4,974,403 A | 12/1990 | Fukui et al. | |
| 5,020,310 A | 6/1991 | Oshima et al. | |
| 5,064,315 A | 11/1991 | Samejima et al. | |
| 5,465,561 A | 11/1995 | Samejima et al. | |
| 5,481,857 A | 1/1996 | Umemoto et al. | |
| 5,626,007 A * | 5/1997 | Harrington et al. ............. | 56/13.5 |
| 6,055,798 A * | 5/2000 | Fulmer et al. ................... | 56/12.7 |
| 6,122,903 A | 9/2000 | Hayashi et al. | |
| 6,237,957 B1 | 5/2001 | Takekata et al. | |
| 6,360,517 B1 | 3/2002 | Ishimori et al. | |
| 6,578,349 B2 * | 6/2003 | Buss et al. ...................... | 56/11.6 |
| 6,659,209 B2 | 12/2003 | Osuga et al. | |
| 6,672,043 B2 | 1/2004 | Shibata et al. | |
| 6,688,091 B2 | 2/2004 | Ishimori | |
| 6,854,249 B1 | 2/2005 | Samajima et al. | |
| 6,874,305 B2 | 4/2005 | Ishimori | |
| 6,877,302 B2 | 4/2005 | Samejima et al. | |
| 7,124,563 B2 | 10/2006 | Shibata et al. | |

* cited by examiner

*Primary Examiner* — Alicia Torres
(74) *Attorney, Agent, or Firm* — Polster Lieder Woodruff & Lucchesi, L.C.

(57) ABSTRACT

This gearbox assembly (50) for a lawnmower (10) includes a gearbox housing (56) having a horizontal input shaft (62) and a vertical output shaft (64). A lawnmower deck (12) is disposed below the gearbox housing (56) and a spindle housing (55) is mounted to the lawnmower deck (12) and the spindle housing includes a passage (57) communicating with the gearbox housing (56). The output shaft (64) extends below the gearbox housing (56) and into the spindle housing (55). The input shaft (62) has a bevel gear (76) which meshes with a bevel gear (78) on the output shaft for driving (74). The output shaft (64) includes spaced bearings (70 and 72) within the gearbox housing (56) and a bearing (74) within the spindle housing (55). Brackets (28 and 30) are attached between the gearbox housing (56) and the lawnmower deck (12) and the spindle housing (55) is attached to the lawnmower deck (12) separately from the gearbox housing (56).

6 Claims, 7 Drawing Sheets

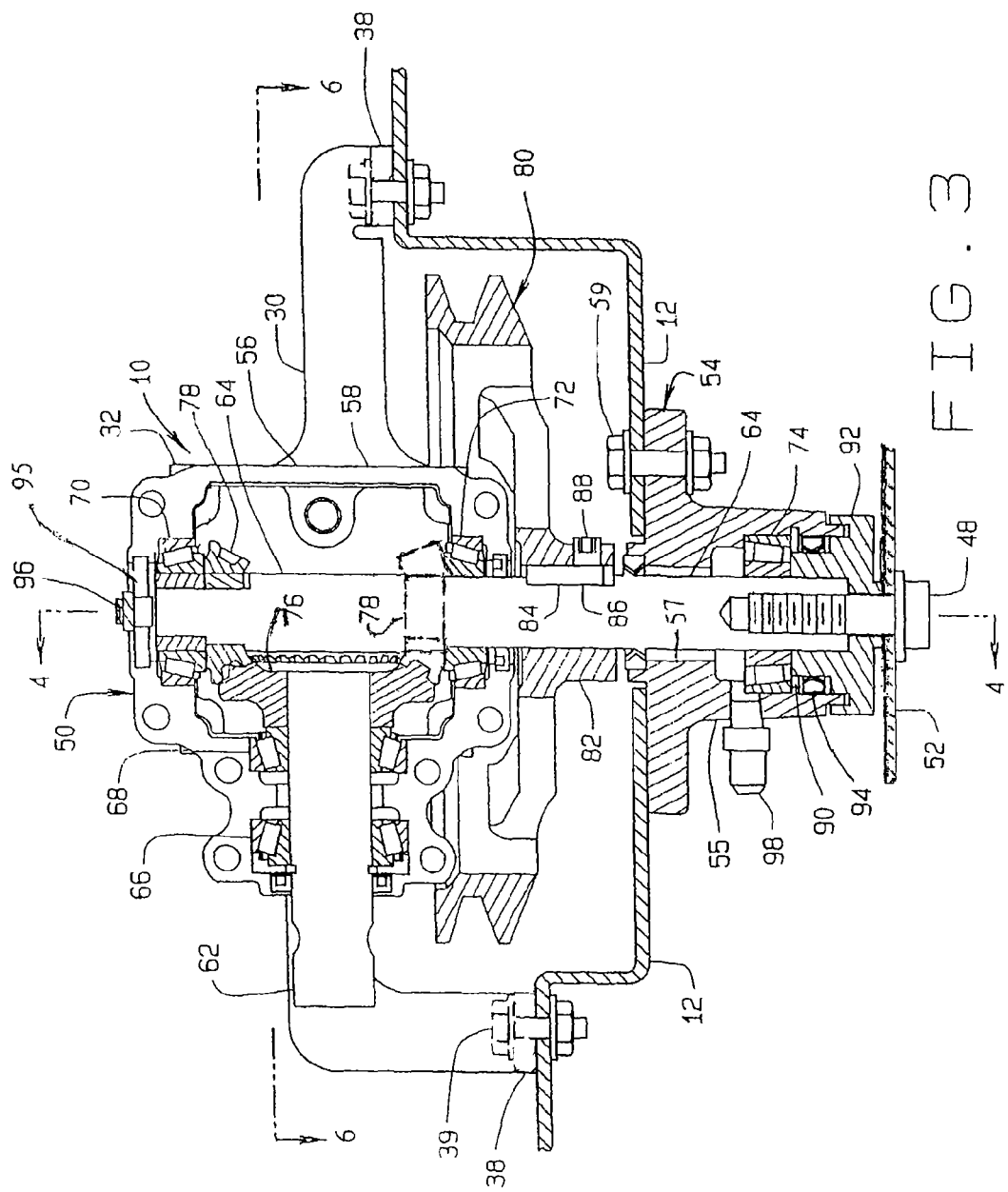

LAWNMOWER GEARBOX

CROSS-REFERENCE TO RELATED APPLICATIONS

Not applicable.

STATEMENT REGARDING FEDERALLY SPONSORED RESEARCH

Not applicable.

BACKGROUND OF THE INVENTION

This invention relates generally to a lawnmower gearbox and particularly to a lawnmower provided with a simplified bevel gear drive and mounting system.

This lawnmower gearbox is similar to the type disclosed in U.S. Pat. No. 5,465,561. It is different in one aspect, in that it utilizes three roller bearings for the output shaft for greater stability and in another aspect it also provides a gearbox mounting having brackets with outrigger arms for supporting the gearbox connecting the gearbox to the spindle assembly.

SUMMARY OF THE INVENTION

It is an aspect of this gearbox assembly for a lawnmower that the gearbox housing includes a horizontal input shaft and a vertical shaft output shaft. A lawnmower deck is disposed below the gearbox housing and a spindle housing is mounted below the lawnmower deck. The spindle housing includes a passage communicating with the gearbox housing and the output shaft extends into the spindle housing. The input shaft has a bevel gear which meshes with a bevel gear on the output shaft, driving the output shaft. The output shaft includes spaced bearings within the gearing housing and a bearing within the spindle housing. A bracket means is attached between gearbox and the lawnmower deck.

It is another aspect of this invention that the spindle housing is attached to the lawnmower deck independently of gearbox housing.

BRIEF DESCRIPTION OF THE DRAWINGS

FIG. 3 is a cross-sectional view of the gearbox taken on the longitudinal axes of the input and output shafts;

DESCRIPTION OF THE PREFERRED EMBODIMENT

Figure 1:
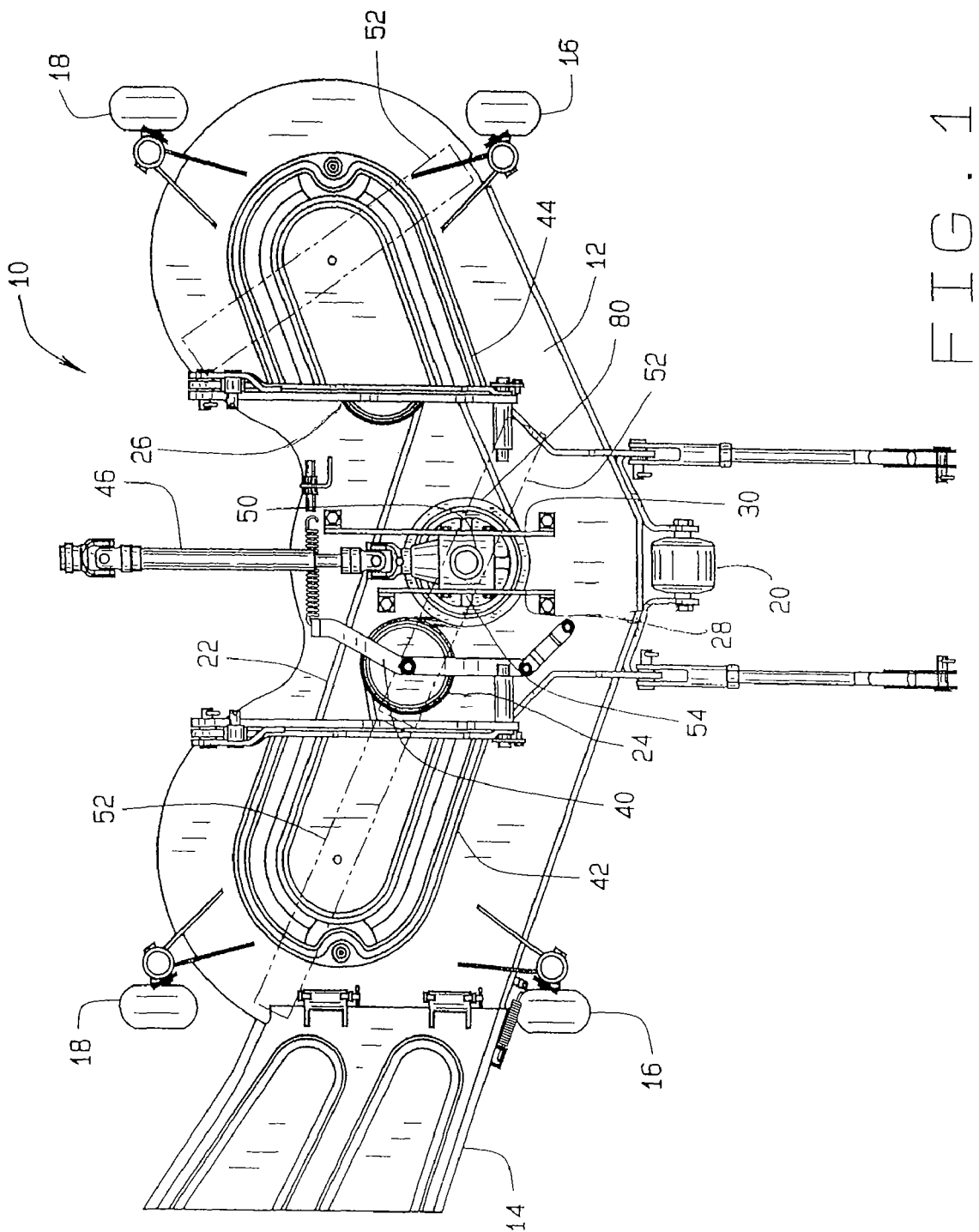
FIG. 1 is a plan view of the lawnmower deck with the gearbox installed

Referring now by reference characters to the drawings and first to FIG. 1 it will be understood that a lawnmower 10 includes, in the embodiment shown, a plurality of cutting blades 52 driven by a gearbox assembly 50 and a spindle assembly 54 and a pulley 80. The lawnmower 10 also includes a deck 12 to which the gearbox assembly 50 and the spindle assembly 54 are attached as will be described.

The lawnmower 10 includes a pair of front rollers 16, a pair of rear rollers 18 and a central roller 20. As also shown in FIG. 1 the lawnmower deck 12 includes right and left shields 42 and 44 for a drive belt 22 having idler pulleys 24 and 26, respectively. A belt tensioner system, generally indicated by numeral 40 is provided for idler pulley 24. Left and right brackets 28 and 30 are provided between the gearbox 50 and the lawnmower deck 12 to mount the gearbox 50 to the deck 12. The lawnmower 10 includes a side chute 14 attached to the deck 12. A drive shaft 46 is attached to input shaft 62.

The gearbox assembly 50 and the spindle assembly 54 will now be described with greater particularity with reference to FIGS. 2, 2A and 3-7.

Figure 4:
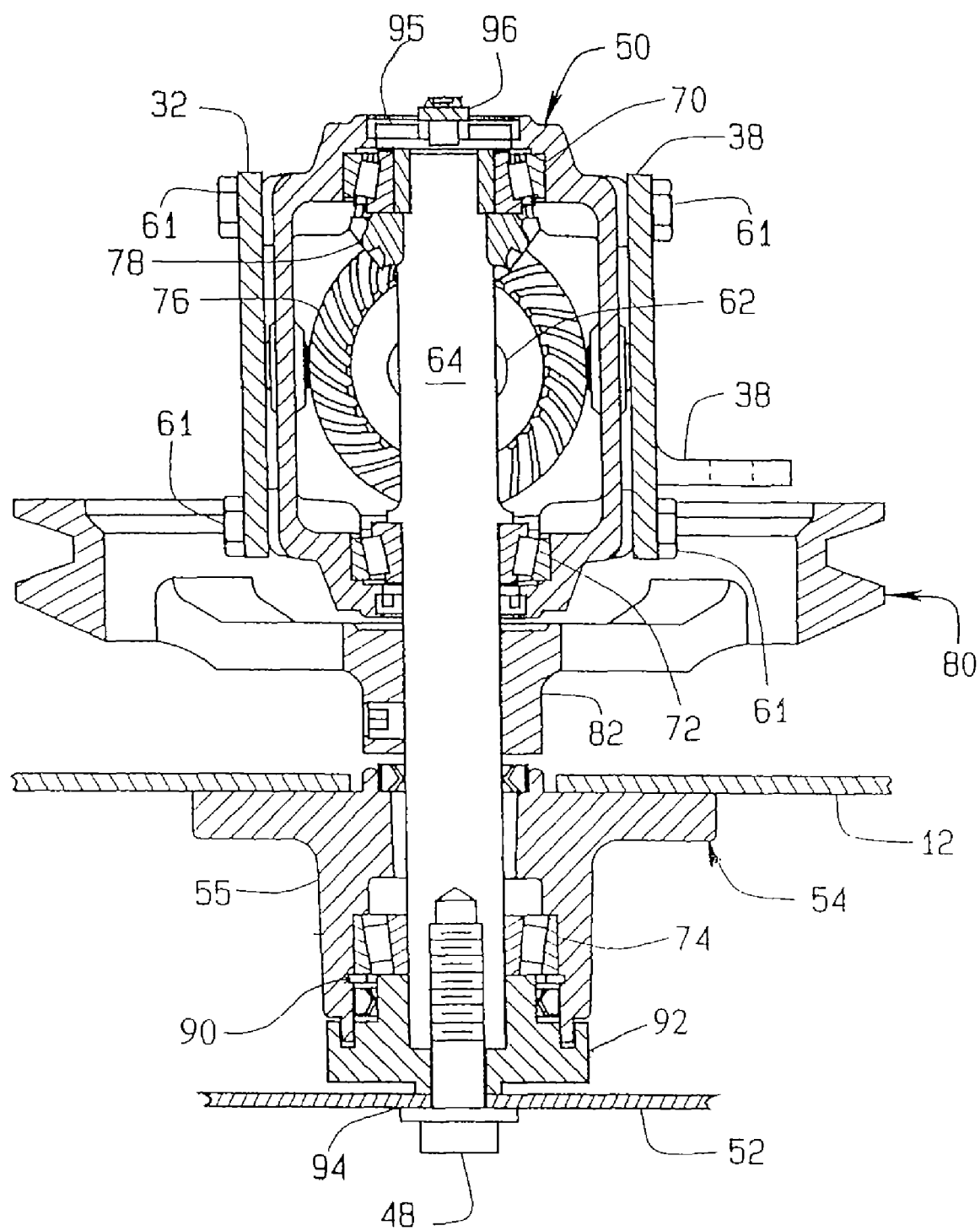
FIG. 4 is a cross-sectional view of the gearbox taken on Line 4-4 of FIG. 3.
Figure 5:
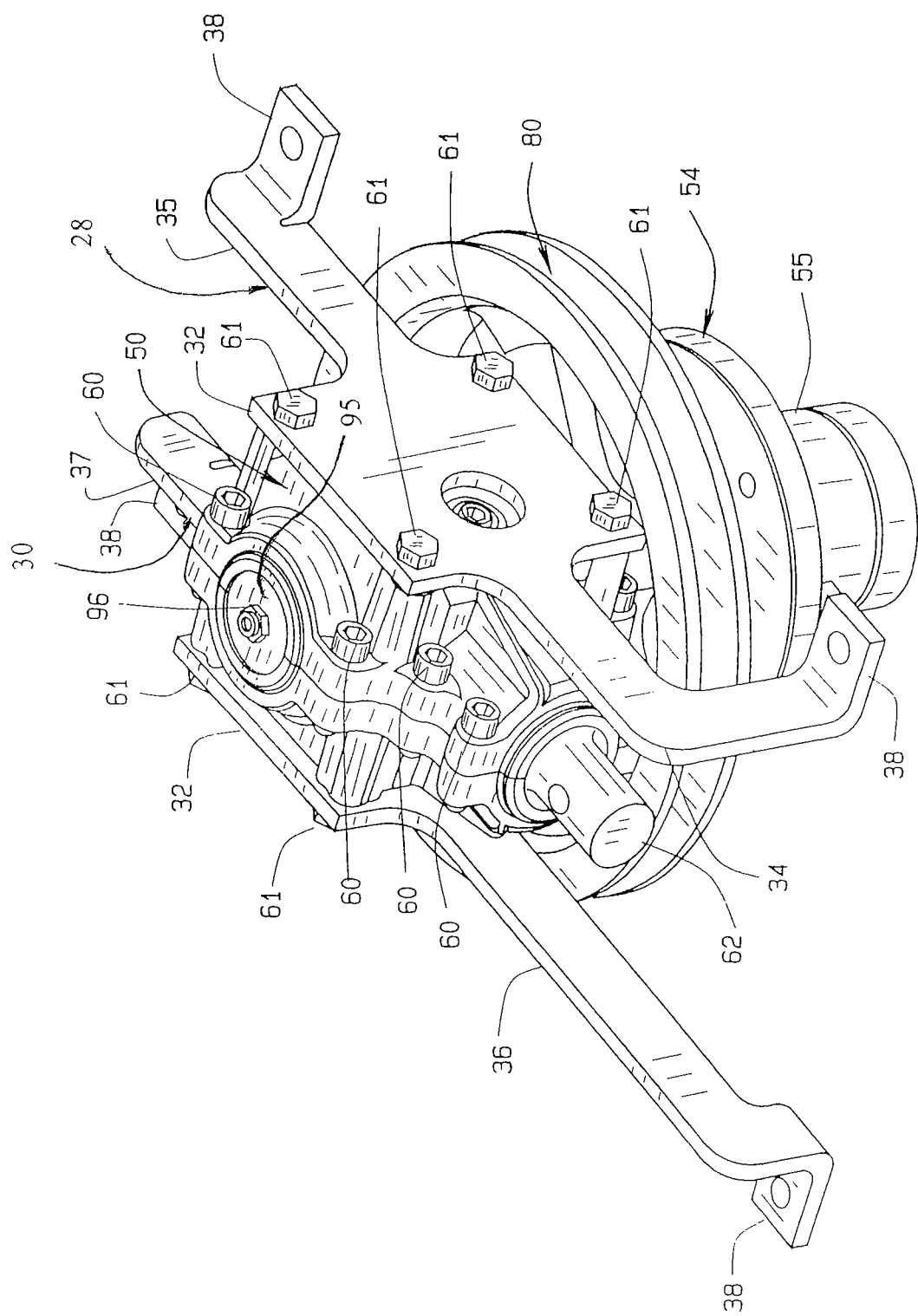
FIG. 5 is a perspective view taken from the input shaft side.
Figure 6:
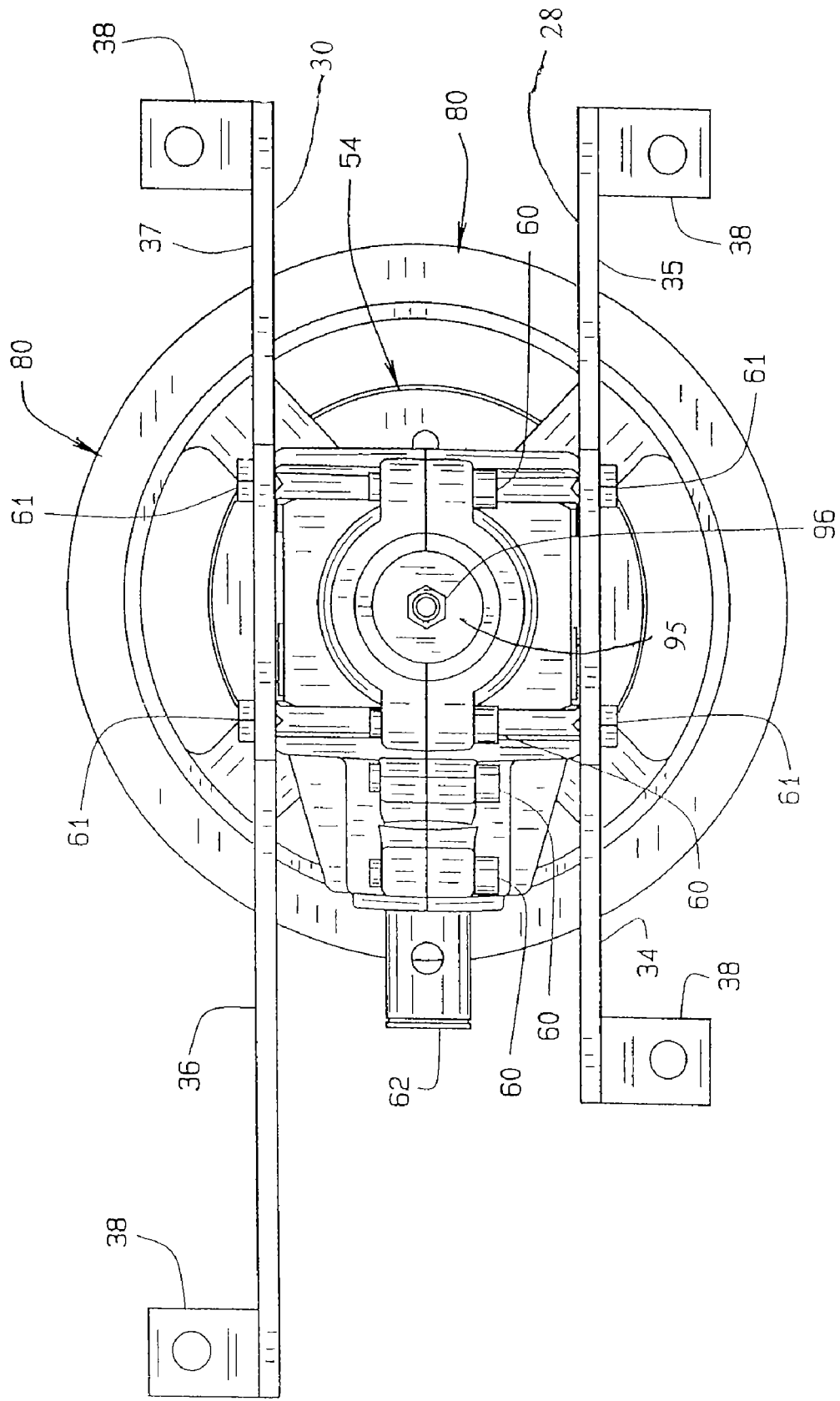
FIG. 6 is a plan view taken on Line 6-6 of FIG. 3.
Figure 7:
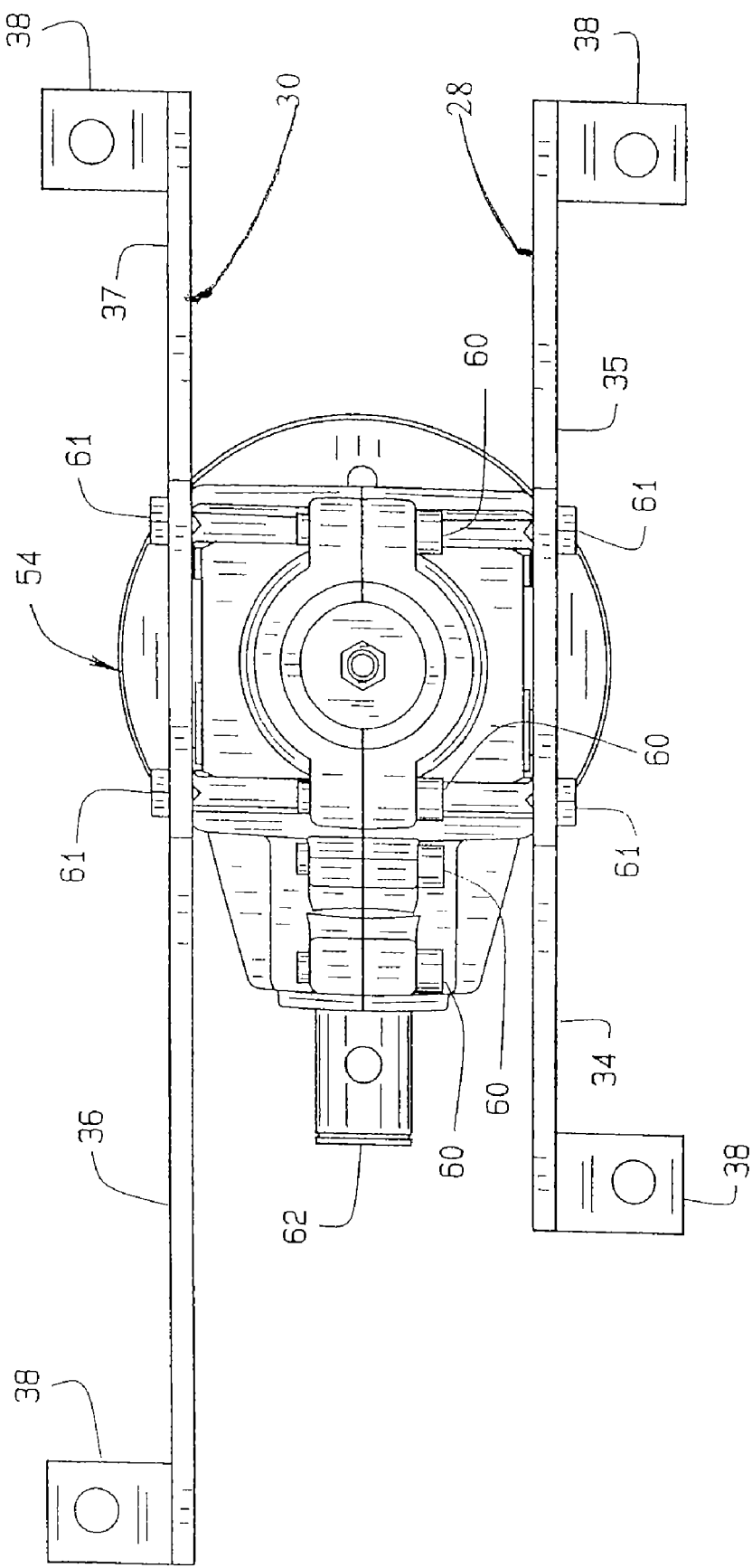
FIG. 7 is a plan view taken on line 6-6 of FIG. 3 with the pulley omitted for clarity.

The gearbox assembly 50, in the embodiment shown, includes a gearbox housing 56 having two halves 58 firmly attached together by eight bolts 60 four at the top and four at the bottom. The spindle assembly 54 is firmly attached to the lawnmower deck 12 below the deck by three bolts in holes 59, separately from the gearbox assembly 50. As shown in FIGS. 3 and 4, the gearbox assembly 50 is firmly attached above the lawnmower deck 12 by means of side brackets 28 and 30, (FIG. 1) each of which includes a central portion 32 attached to the gearbox halves 58 by four bolts 61 on each side and elongate outrigger arm portions 34, 35, 36 and 37 each having an outwardly turned flange 38, and the outrigger arm portions being of a length to attach the flange 38 to the deck 12 at an appropriate elevation and bridge the depression formed in the deck to accommodate the pulley 80. The flanges 38 are attached to the deck by bolts 39.

Figures 2, 2A:
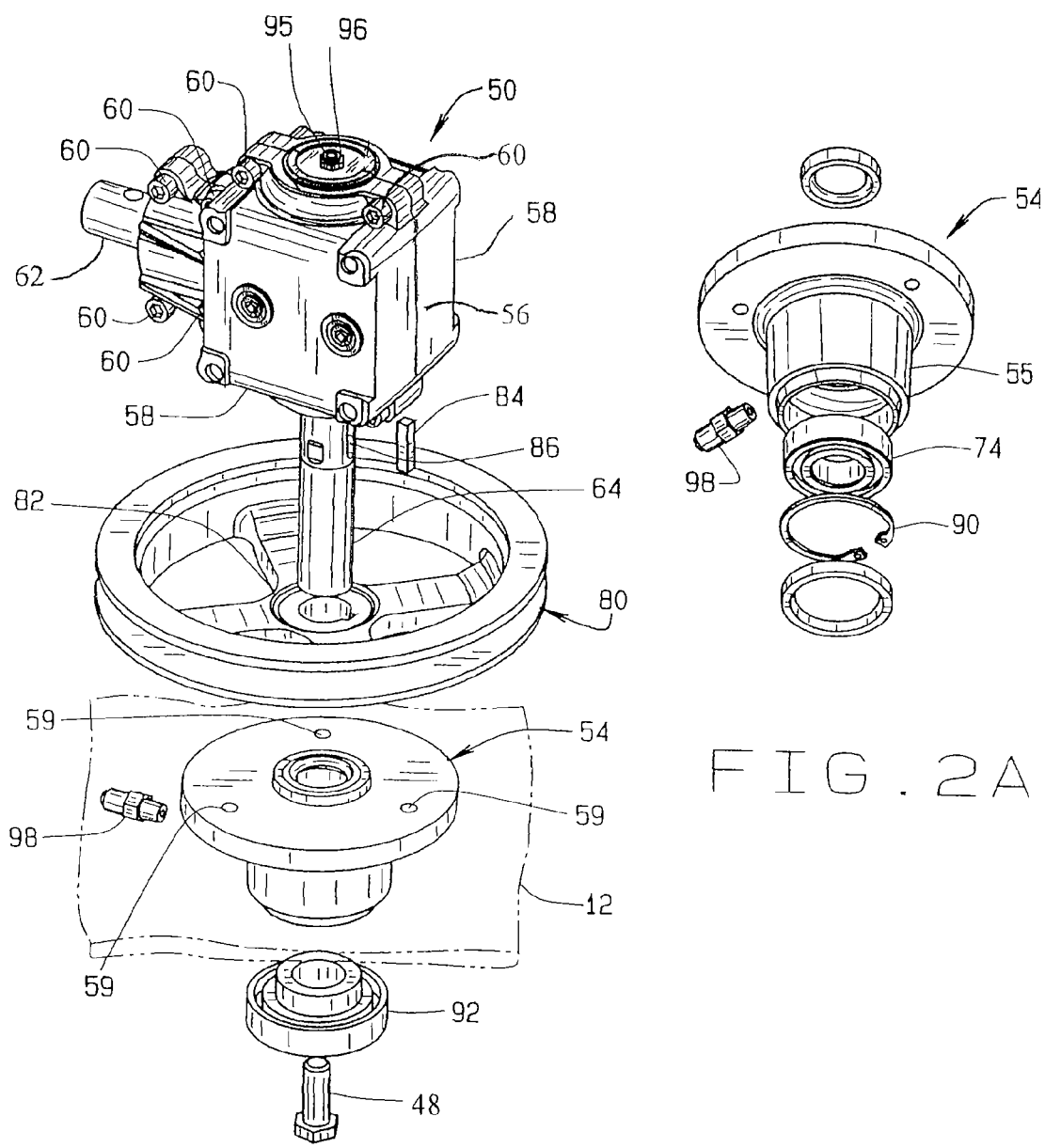
FIG. 2 is an exploded perspective view of the gearbox.
FIG. 2A is an exploded perspective view of the spindle assembly.

Turning now to the internal working parts of the gearbox assembly 50 it will be understood from FIGS. 2, 3 and 4 that these parts include a horizontal input shaft 62 and a vertical output shaft 64. As shown, FIG. 3, the output shaft 64 is driven by the input shaft 62 and the output shaft 64 is received by an oversize passage 57 within the spindle housing 55 to drive lawnmower blades 52, which are attached, as by bolts 48, to the lower end of said output shaft 64. More particularly, the input shaft 62 is held by two spaced rolling element bearings 66 and 68 and includes a bevel gear 76 which is disposed at the end of the input shaft 62. The output shaft 64 is held by three rolling element bearings: two rolling element bearings 70 and 72 within the gearbox housing 56 of the gearbox assembly 50 and rolling element bearing 74 in the spindle housing 55, at its lower end. At least the roller element bearings within the gearbox assembly are tapered roller element bearings as shown in FIG. 3. The bevel gear 78 is carried by the output shaft 64 between two rolling element bearings 70 and 72 and is driven by bevel gear 76 at the end of the input shaft 62 and meshes with the output shaft bevel gear 78 above the input shaft bevel gear 76. It will be understood that the input shaft bevel gear 76 could also mesh with said output bevel gear 78 below said input shaft bevel gear 76 as shown in dotted outline in FIG. 3. A third rolling element bearing 74 is provided for the output shaft 64 in the spindle housing 55. An end cap 95 is provided to seal the upper end of the output shaft 64, said end cap including a pressure relief valve 96.

A pulley 80 is carried by the output shaft 64, the pulley including a boss 82 which is secured to the output shaft 64 by a key 84 which fits into a slot 86 provided in the output shaft 64 and held in place by a set screw 88.

The spindle assembly 54 provides a housing 55 for the rolling element bearing 74 as discussed above and the housing 55 includes a retainer 90 and a blade adapter 92 apertured to receive the bolt 48 holding said blade adapter shaft seal 94 in place.

It will be observed that the gearbox assembly 50, in particular, is supported by three rolling element bearings supporting the output shaft 64. Two are in the gearbox housing 56 and one is in the spindle housing 55. Thus, the output shaft 64 is firmly held in rotatable relation by the three rolling element bearings.

It will also be noted that the gearbox housing 56 is firmly attached to the lawnmower deck 12 independently of the attachment of the spindle assembly 54 without resorting to common bolts between these two parts.

It is thought that the details of the structure of this lawnmower gearbox have been understood from the foregoing description of parts but for completeness of disclosure the installation of the gearbox assembly 50 on the deck 12 will be briefly described.

Referring to FIGS. 2 and 3 the spindle assembly housing 55 is attached to the underside of the lawnmower deck 12 by means of bolts in holes 59. The output shaft 64 is inserted into the gearbox assembly 50 as a pre-assembled unit including the rolling element bearings 70 and 72 and the bevel gear 78. The pre-assembled input shaft 62 complete with roller element bearings 66 and 68 and bevel gear 76 is inserted into the gearbox housing 56 so that the bevel gear 76 meshes with the bevel gear 78. The pulley boss 82 of the pulley 80 is next attached to the output shaft 64 and fixed into place by the key slot and set screw arrangement 84, 86 and 88. The shaft 64, complete with the pulley 80, is then lowered into place within the oversize opening 57 and the blade adapter 92 and the rolling element bearing 74 temporarily in place but without the blade 52 in place. Next the central portions 32 are bolted to the respective gearbox halves 58 so that the outrigger portions of the brackets 28 and 30 and more specifically the outwardly turned flanges 38, are in place above the deck plate opening 39 so that they can be bolted to the deck plate 12. Finally, the blade adapter bolt 48 is removed and replaced with the blade 52 attached, and the bolt 48 is replaced to hold the blade 52 firmly in place. It will be understood by one skilled in the art that seals such as seal 94 are to be emplaced during the course of the installation of the primary elements as outlined above.

Although this improved Lawnmower Gearbox has been described by making particular reference to a preferred lawnmower construction, the details of description are not to be understood as restrictive, numerous variants being possible within the scope of the claims hereunto appended.

The invention claimed is:

1. A lawnmower gearbox assembly comprising:
   a. a gearbox housing having an input shaft and output shaft;
   b. a lawnmower deck disposed below the gearbox housing;
   c. a spindle housing operatively mounted below the lawnmower deck and including a passage disposed below the gearbox housing and communicating with the gearbox housing;
   d. the output shaft extends below the gearbox housing and through the lawnmower deck and into the spindle housing;
   e. the input shaft has a bevel gear attached thereto for rotating a bevel gear attached to the output shaft; and
   f. the input shaft includes spaced bearings and the bevel gear is at the inner end thereof;
   g. the output shaft includes spaced bearings within the gearbox housing and a bearing disposed within the spindle housing and the bevel gear attached to the output shaft is disposed between the spaced bearings and meshing with the input shaft bevel gear; and
   h. bracket means attached between the gearbox housing and the lawnmower deck including a plurality of opposed pairs of elongate outrigger arms extending outwardly from a mid portion of the bracket means and operatively attached to the gearbox, the arms including horizontal ends operatively turned at right angles and attached to the lawnmower deck and the arms between each end being clear of the deck while the turned arm ends are operatively seated on the deck parallel with the deck to provide means of seating the gearbox on the deck.

2. A gearbox as defined in claim 1 wherein the attachment of the gearbox to the lawnmower deck is separate from the attachment of the spindle housing to the lawnmower deck.

3. A gearbox as defined in claim 1 wherein the attachment of the gearbox housing to the lawnmower deck is by the opposed pairs of outrigger arms extending outwardly from each side of the mid portion, across the gearbox, and bridging a blade pulley depression.

4. A gearbox as defined in claim 1 wherein the output shaft bevel gear is mounted alternatively above or below the input shaft bevel gear.

5. A lawnmower gearbox assembly comprising:
   a. a gearbox housing having opposed sides and a generally horizontal input shaft and a generally vertical output shaft;
   b. a lawnmower deck disposed below the gearbox housing;
   c. a pair of elongate brackets attached to each side of the gearbox and directed in opposite directions, the brackets providing a single elongate outrigger arm extending across the gearbox and extending across a depression defined by a blade pulley diameter, and flanges are attached to a continuous outrigger arm so that the outrigger arms are substantially clear of the deck at a remote end to operatively seat the flanges on the deck parallel with the deck to support the gearbox.

6. A lawnmower gearbox assembly as defined in claim 5 wherein opposed outrigger arms are of unequal length.

* * * * *